United States Patent
Oda et al.

(10) Patent No.: US 7,554,248 B2
(45) Date of Patent: Jun. 30, 2009

(54) ULTRASONIC SENSOR

(75) Inventors: Kiyonari Oda, Gamagori (JP);
Hisanaga Matsuoka, Okazaki (JP);
Yoshihisa Sato, Nagoya (JP); Hiroyuki Kani, Okazaki (JP)

(73) Assignees: DENSO CORPORATION, Kariya (JP);
Nippon Soken, Inc., Nishio (JP)

( * ) Notice: Subject to any disclaimer, the term of this patent is extended or adjusted under 35 U.S.C. 154(b) by 510 days.

(21) Appl. No.: 11/280,352

(22) Filed: Nov. 17, 2005

(65) Prior Publication Data
US 2006/0158066 A1 Jul. 20, 2006

(30) Foreign Application Priority Data
Jan. 20, 2005 (JP) ............... 2005-013188

(51) Int. Cl.
*H01L 41/08* (2006.01)
(52) U.S. Cl. ...................................... 310/348
(58) Field of Classification Search ................. 310/330, 310/334, 311, 322, 369, 348; 73/632, 349
See application file for complete search history.

(56) References Cited

U.S. PATENT DOCUMENTS

| | | | |
|---|---|---|---|
| 4,556,814 A * | 12/1985 | Ito et al. | |
| 4,577,132 A * | 3/1986 | Ohigashi et al. | 310/311 |
| 5,446,332 A * | 8/1995 | Rapps et al. | 310/334 |
| 5,629,690 A * | 5/1997 | Knoll | |
| 6,792,810 B2 | 9/2004 | Kupfernagel et al. | |
| 7,246,523 B2 * | 7/2007 | Magane et al. | 73/649 |

FOREIGN PATENT DOCUMENTS

| | | | |
|---|---|---|---|
| DE | 29 36 672 A1 * | 3/1981 |
| DE | 43 23 134 C1 * | 6/1994 |
| JP | A-01-190097 | 7/1989 |
| JP | A-2000-023288 | 1/2000 |
| JP | A-2001-16694 | 1/2001 |
| JP | A-2001-238292 | 8/2001 |

OTHER PUBLICATIONS

Office Action dated Mar. 26, 2008 in corresponding German Patent Application No. 10 2005 056 607.3-35 (and English translation).*

* cited by examiner

*Primary Examiner*—Quyen P Leung
*Assistant Examiner*—Karen B Addison
(74) *Attorney, Agent, or Firm*—Posz Law Group, PLC

(57) ABSTRACT

An ultrasonic sensor includes an inner case mainly made of plastic and having a shape of a cylinder with a bottom portion. A conductive film is attached to the bottom portion. An electrode formed at a surface of the piezoelectric vibrator is attached to the conductive film to be electrically connected with the conductive film. Therefore, by connecting leads with the conductive film and another electrode at the other side of the piezoelectric vibrator, the electric conduction between an external circuit and both electrodes at both surfaces of the piezoelectric vibrator is ensured.

18 Claims, 4 Drawing Sheets

FIG. 8A
PRIOR ART
FIG. 8B
PRIOR ART
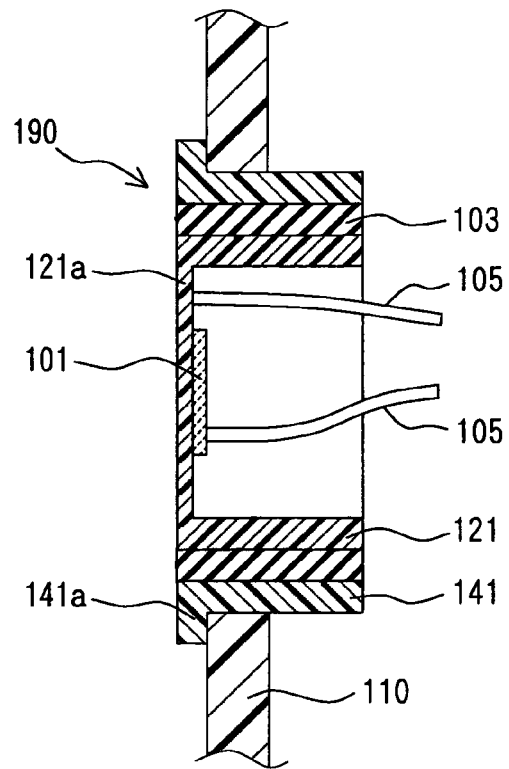
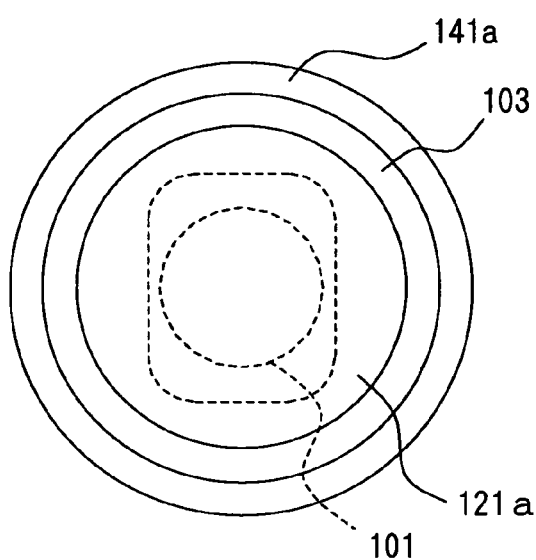

ULTRASONIC SENSOR

CROSS REFERENCE TO RELATED APPLICATION

This application is based on and incorporates herein by reference Japanese patent application No. 2005-13188 filed on Jan. 20, 2005.

FIELD OF THE INVENTION

The present invention relates to an ultrasonic sensor, and in particular to an ultrasonic sensor suitable for use as a corner sonar or a rear sonar in detecting a distance between a vehicle and its surrounding obstacle.

BACKGROUND OF THE INVENTION

In JP-2001-16694-A, an ultrasonic sensor is disclosed which is installed in a vehicle and detects a distance between the vehicle and its surrounding obstacle when the vehicle is being parked or turning. This conventional ultrasonic sensor is shown in FIGS. 8A and 8B and designated with reference numeral 190.

In the ultrasonic sensor 190 in FIGS. 8A and 8B, an inner case 121 with a piezoelectric vibrator 101 attached to its bottom portion 121a is covered by a vibration-absorption body 103 such as a rubber. The inner case 121, the piezoelectric vibrator 101, and the vibration-absorption body 103 are inserted into an outer case 141 having a flange portion 141a. The inner case 121 is a metal can which has a shape of a cylinder having a bottom and is made of, for example, aluminum. The ultrasonic sensor 190 with such a structure is embedded in a hole on the bumper 110 of the vehicle, with the bottom portion 121a facing the outside of the vehicle.

The ultrasonic sensor 190 installed in the bumper 110 transmits an ultrasonic sound by causing, by means of the piezoelectric vibrator 101, the bottom portion 21a to vibrate as a vibration plate, receives at the piezoelectric vibrator 101 the ultrasonic sound reflected by the obstacle, and thus detects the obstacle.

The ultrasonic sound generally used for the propagation in the air has a frequency within a low frequency range, for example, below 100 kHz, because the ultrasonic sound decays faster in the air as its frequency becomes higher. The thickness and the size of the inner case 121 of the ultrasonic sensor 190 are designed so that the bottom portion 121a vibrates at an intended frequency.

Therefore, the requirement for the vibration frequency of the bottom portion 121a makes it very difficult to miniaturize the inner case 121 beyond a certain extent. In fact, the resonance frequency of the inner case 121 becomes higher than the low frequency range if the inner case 121 is made of metal (such as aluminum) like the conventional ultrasonic sensor. The difficulty may be overcome if the thickness of the inner case 121 is reduced. However, there is almost no room for reducing the thickness in view of requirement for avoiding a physical damage on the inner case 121.

In view of this, the inventors of the present invention considered using a plastic case in place of the conventional metal case. The consideration is based on an expectation that an ultrasonic sensor with the plastic case can be miniaturized while keeping its vibration frequency within the low frequency range, because the plastic is less stiff than the metal.

However, the inventors found it necessary to solve problems as follows in using the plastic case as a case of the ultrasonic sensor.

The first problem is related to electric conduction of electrodes of the piezoelectric vibrator. Each of the electrodes is formed on each side surfaces of a piezoelectric substance of the piezoelectric vibrator and is for driving the piezoelectric substance. In the conventional ultrasonic sensor, one of the side surfaces forming the electrodes is attached to the inner case 121 to fix the piezoelectric vibrator 101 and the electric conduction of the electrode attached to the inner case 121 is achieved through the metal inner case 121. In fact, as shown in FIGS. 8A and 8B, one of leads 105 is connected with the bottom portion 121a of the inner case 121. However, the plastic case cannot be used to achieve the electric conduction of the electrode in the same manner as the metal case.

The second problem is that the bottom portion of the plastic case as a vibration plate possibly generates an unwanted resonance at a frequency other than the intended frequency, because the plastic case is less stiff. It is preferable to diminish the unwanted resonance, because it may harm reverberation characteristics and directional characteristics of the ultrasonic sensor.

SUMMARY

It is therefore an object of the present invention to provide an ultrasonic sensor which enables use of a plastic case.

An ultrasonic sensor comprises, in an aspect, a case mainly made of insulating plastic and having a shape of a cylinder with a bottom portion, and a piezoelectric vibrator fixed to an interior surface of the bottom portion facing an interior of the case. In addition, the piezoelectric vibrator has two electrodes. One of the electrodes is at a fixing surface of the piezoelectric vibrator through which the piezoelectric vibrator is fixed to the bottom portion. The other one of the electrodes is at an opposite surface of the piezoelectric vibrator opposite to the fixing surface. In addition, the piezoelectric vibrator is fixed to the bottom portion by being attached to an electrically conductive member in contact with the interior surface, and electric conduction with the first electrode is achieved through the electrically conductive member.

As described above, in the ultrasonic sensor, the piezoelectric vibrator is attached to the electrically conductive member in contact with the interior surface of the bottom portion. Thus, the electrode on the fixing surface is electrically connected with the electrically conductive member. Therefore, it is possible to ensure electric conduction with the electrode at the fixing surface through the electrically conductive member. As a result, it is easy to achieve electric conduction with the electrode even if the case is made of the plastic.

In another aspect of the present invention, an ultrasonic sensor includes a case mainly made of plastic and having a shape of a cylinder with a bottom portion, a piezoelectric vibrator fixed to an interior surface of the bottom portion facing an interior of the case, and a stiffness improving member giving a reinforcement to the stiffness of the bottom portion in order to make the bottom portion stiffer than the plastic.

Thus, the unwanted resonance of the bottom portion at a frequency other than the intended frequency is diminished and the ultrasonic sensor achieves reverberation characteristics and directional characteristics which are comparable to the metal case.

In a further aspect, an ultrasonic sensor includes a case mainly made of plastic and having a shape of a cylinder with a bottom portion, and a piezoelectric vibrator having electrodes each of which is at each of side surfaces of the piezoelectric vibrator, wherein each of electrically conductive leads is connected with each of the electrodes, and at least one of the side surfaces is embedded in the bottom portion.

Thus, the piezoelectric vibrator can be fixed to the bottom portion with its electric conduction to the electrodes ensured.

BRIEF DESCRIPTION OF THE DRAWINGS

The above and other objects, features and advantages of the present invention will become more apparent from the following detailed description made with reference to the accompanying drawings. In the drawings:

FIG. 8A is a cross-sectional view of a conventional ultrasonic sensor; and

FIG. 8B is a top view of the conventional ultrasonic sensor.

DETAILED DESCRIPTION OF THE EMBODIMENTS

First Embodiment

Figure 1A:
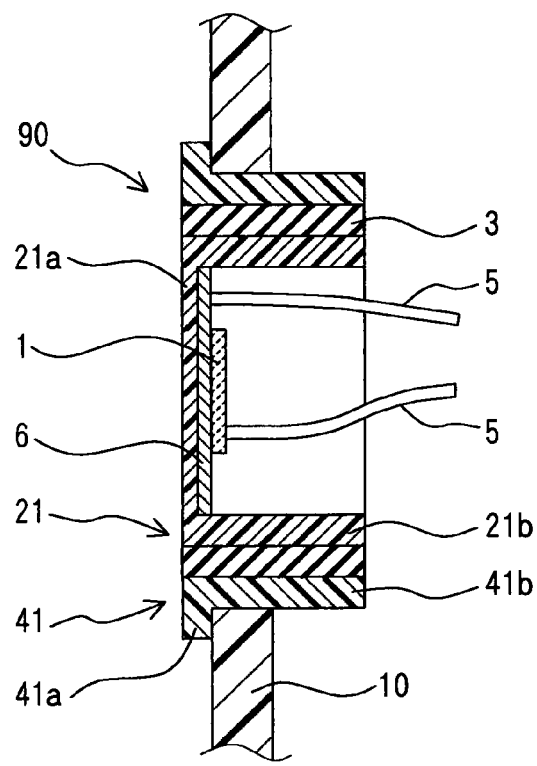
FIG. 1A is a cross-sectional view of an ultrasonic sensor according to a first embodiment.
Figure 1B:
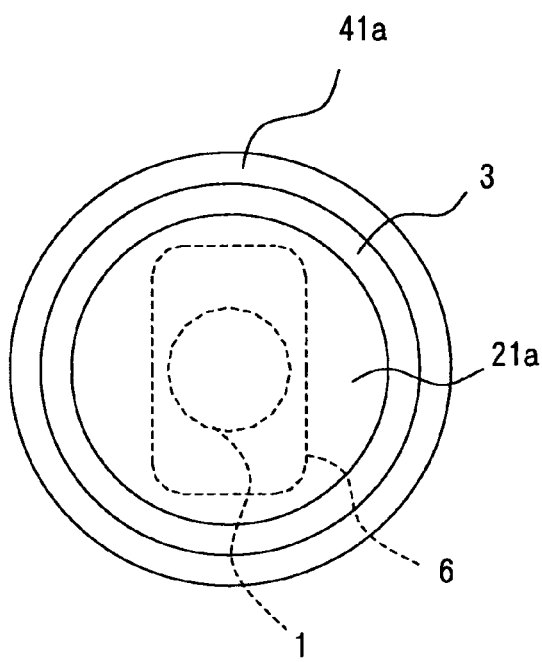
FIG. 1B is a top view of the ultrasonic sensor.

As shown in FIGS. 1A and 1B, an ultrasonic sensor 90 according to the first embodiment has an inner case 21, which has a shape of a cylinder having a bottom portion 21a. The inner case 21 has the generally round disk-like bottom portion 21a and a cylindrical portion 21b which is connected with the edge of the bottom portion 21a to provide a can-shape. The inner case 21 is made of insulating plastic which is less stiffer (i.e. with less Young's modulus or specific gravitation) than metal.

It is preferable to use, as the plastic, poly phenylene sulfide (PPS) or phenolic plastic having a low coefficient of thermal expansion, because they can suppress change of their resonance frequency caused by change in their temperature. The plastic may include a glass fiber as a filler to suppress the coefficient of thermal expansion thereof.

A generally rectangular electrically conductive film 6 is attached to an interior surface of the bottom portion 21a facing an interior of the inner case 21. The conductive film 6 is formed as a plate or foil from metal such as aluminum and silver, and is attached to the interior surface of bottom portion 21a with epoxy adhesive or acrylic adhesive.

If the inner case 21 is made by molding, it may be made by insert-molding by using the conductive film 6 as an inserted material to be inserted, so that the outer peripheral edge of the conductive film 6 is supported by being sandwiched by the inner case 21. In this case, a portion of the conductive film 6 is embedded in the inner case 21 and therefore the conductive film 6 is fixed firmly to the bottom portion 21a. In addition, the conductive film 6 may be formed on the bottom portion 21a by a plating method or an evaporation method.

A piezoelectric vibrator 1 is bonded to the conductive film 6 with the adhesive shown above. The piezoelectric vibrator 1 has a piezoelectric body which is constituted by a piezoelectric ceramics such as PZT, and the piezoelectric body is attached to each of two electrodes at each of side faces thereof, respectively. The electrodes retrieve an electric potential according to the displacement of the piezoelectric body. The electrodes are made of, for example, silver and are formed by being printed to the piezoelectric body and being sintered.

The cylindrical portion 21b is inserted in an outer case 41 with a vibration-absorption body 3 such as a rubber located between the outer case 41 and the cylindrical portion 21b. The outer case 41 includes a flange portion 41a which extends along the radial direction of the outer case 41 with its end at an end of the outer case 41b. The flange portion 41a gets stuck on an opening mouth formed on a bumper 10 of a vehicle, when the ultrasonic sensor 90 is inserted in the opening mouth with an exterior surface of the bottom portion 21a exposed. The ultrasonic sensor 90 is attached to the bumper 10 in this manner.

The vibration-absorption body 3 has a shape of a cylinder with its both ends open. The vibration-absorption body 3 suppresses transmission of vibration from the inner case 21 through the outer case 41 to the bumper 10 at the edge of the opening mouth and transmission of the vibration reflected at a portion of the bumper 10 (e.g., a corner portion and a rib forming portion) and returning to the bottom portion 21a.

In the ultrasonic sensor 90, the piezoelectric vibrator 1 is fixed to the bottom portion 21a through the conductive film 6. When the piezoelectric vibrator 1 vibrates by receiving driving voltage (specifically alternating voltage) between both the electrodes, the bottom portion 21a vibrates with its edge being a node and its center being an antinode, driven by the vibration of the piezoelectric vibrator 1. Thus, the bottom portion 21a functions as a vibration plate and generates an ultrasonic sound in accordance with the frequency of its vibration.

In addition, when the inner case 21 vibrates in response to the ultrasonic sound reflected at a target for detection, the vibration is transmitted to the piezoelectric vibrator 1. Since the piezoelectric body of the piezoelectric vibrator 1 is displaced by the transmitted vibration, the electric potential can be retrieved from the electrodes depending on the vibration (i.e. the displacement of the piezoelectric body).

Here, the characteristics of the ultrasonic sensor 90 will be described. The ultrasonic sensor 90 uses the plastic inner case 21. Therefore it is easy to miniaturize the ultrasonic sensor 90. This comes from the fact that the plastic less stiff than the metal makes it possible to keep the vibration frequency of the bottom portion 21a within an intended frequency range (e.g., below 100 kHz).

In addition, the conductive film 6 is formed on the interior surface of the bottom portion 21a and the piezoelectric vibrator 1 is attached to the conductive film 6. Therefore, when the piezoelectric vibrator 1 is attached to the conductive film 6, the conductive film 6 comes in touch with the electrode at a fixing face of the piezoelectric vibrator 1 facing the bottom portion 21*a*, and the electric conduction between the electrode and the conductive film 6 are achieved. Therefore, the electric conduction with an external circuit and the electrode at the fixing surface is achieved through the conductive film 6.

To be more specific, as shown in FIG. 1A, each of leads 5 is electrically connected with each of the electrodes respectively, with one of the leads 5 being connected with the conductive film 6 and the other of the leads 5 being connected with an opposite surface of the piezoelectric vibrator opposite to the fixing surface. Thus, it is easy to establish the electric conduction with the electrodes of the piezoelectric vibrator 1, even if the inner case 21 is made of the plastic.

In addition, the ultrasonic sensor 90 includes a stiffness improving member giving a reinforcement to the stiffness of the bottom portion 21*a* in order to make the bottom portion stiffer than that which the plastic itself has. Thus, the unwanted resonance of the bottom portion 21*a* at a frequency other than the intended frequency is diminished, and the ultrasonic sensor 90 achieves reverberation characteristics and directional characteristics which are comparable to the metal case.

The conductive film 6 may function as the stiffness improving member. Specifically, the conductive film 6 may be a metal plate stiffer than the plastic and attached to the bottom portion 21*a* to improve the stiffness of the bottom portion 21*a*.

Figure 2A:
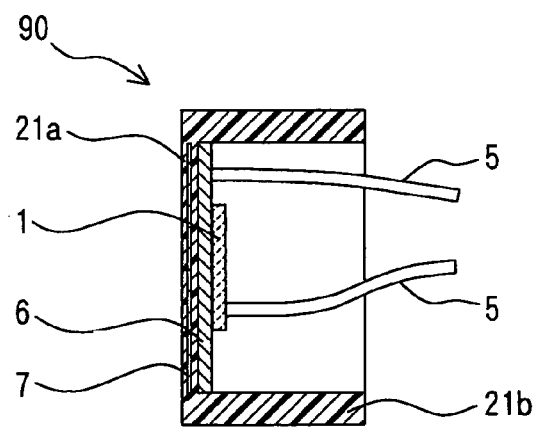
FIG. 2A is a cross-sectional view of the ultrasonic sensor in the case that the ultrasonic sensor has a reinforcing plate stiffer than plastic.

The stiffness improving member may be constituted by any other member than the conductive film 6. For example, as shown in FIG. 2A, a reinforcing plate 7 which is stiffer than the plastic may be embedded in the bottom portion 21*a*. The inner case 21 with such a reinforcing plate 7 may be manufactured by plastic injection molding which uses the reinforcing plate 7 as an inserted material.

Figure 2B:
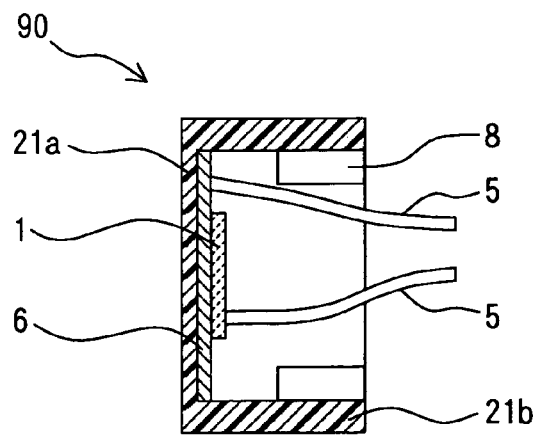
FIG. 2B is a cross-sectional view of the ultrasonic sensor in the case that the ultrasonic sensor has a ring-like reinforcing member stiffer than the plastic.

Alternatively, as shown in FIG. 2B, a reinforcing member 8, which has a ring-like shape and is stiffer than the plastic, may be attached to the cylindrical portion 21 b. When the bottom portion 21*a* vibrates, the cylindrical portion 21*b* is also deformed. Specifically, when the bottom portion 21*a* moves toward the direction to the interior of the cylindrical portion 21*b*, the cylindrical portion 21*b* is deformed in a way that an open mouth thereof expands. In addition, when the bottom portion 21*a* moves away from the cylindrical portion 21*b*, the cylindrical portion 21*b* is deformed in a way that an open mouth thereof shrinks.

The deformation of the cylindrical portion 21*b* caused by the vibration of the bottom portion 21*a* can be suppressed, by attaching the ring-like reinforcing member 8 to the cylindrical portion 21*b*, as shown in FIG. 2B. As a result, the deformation of the bottom portion 21*a* is also suppressed, that is, the stiffness of the bottom portion 21*a* is improved.

Moreover, as shown in FIGS. 3A, 3B, 4A, and 4B, the stiffness improving member may be glass fibers mixed as a filler in the plastic. In this case, the glass fibers are oriented in the radial direction R, which is perpendicular to the thickness D of the bottom portion 21*a*. Thus, the stiffness of the bottom portion 21*a* is improved.

Figure 3A:
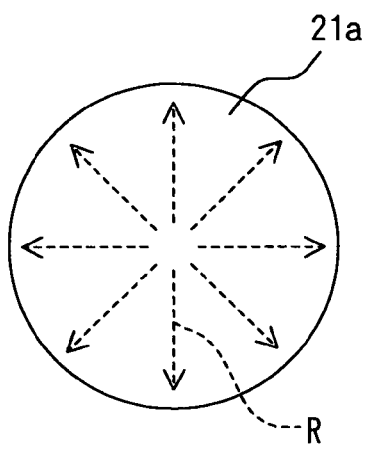
FIG. 3A is a top view of a bottom portion of the ultrasonic sensor showing heading directions of glass fibers therein in the case that the plastic is injected into the bottom portion from its center.
Figure 3B:
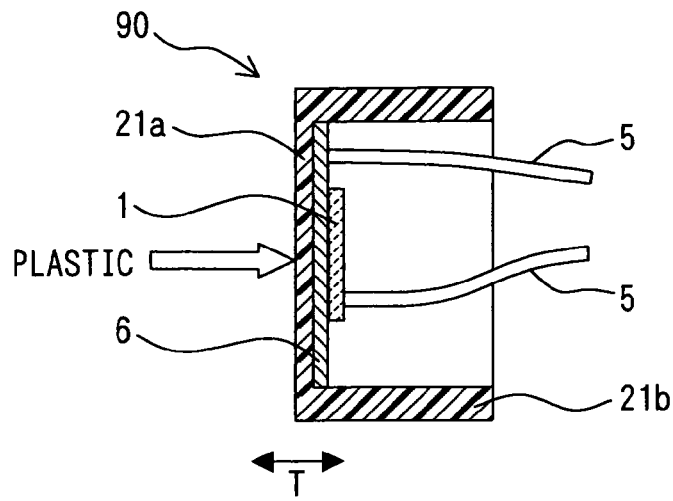
FIG. 3B is a cross-sectional view of the ultrasonic sensor in FIG. 3A showing a position from which the plastic is injected.
Figure 4A:
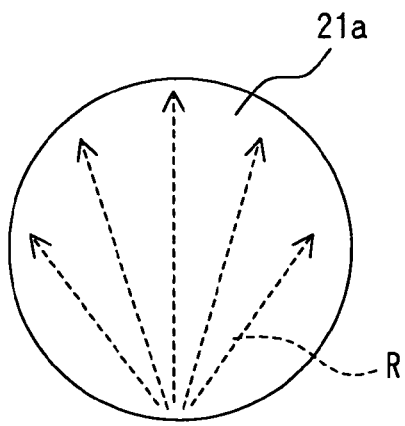
FIG. 4A is a top view of a bottom portion of the ultrasonic sensor showing heading directions of glass fibers therein in the case that plastic is injected into the bottom portion from its edge.
Figure 4B:
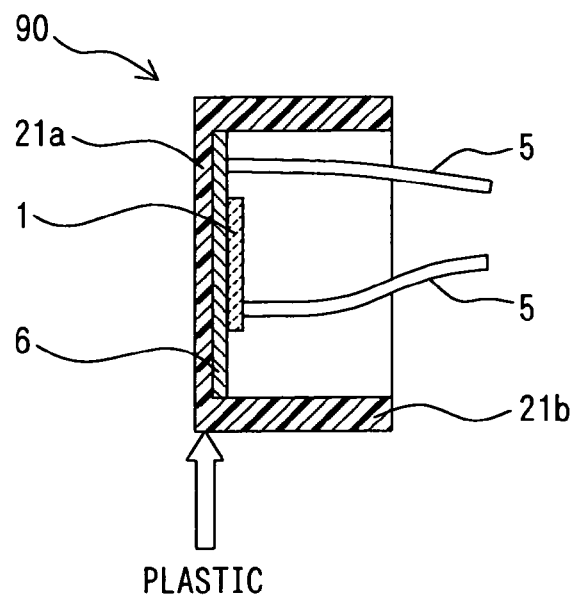
FIG. 4B is a cross-sectional view of the ultrasonic sensor in FIG. 4A showing a position from which the plastic is injected.

In order to orient the glass fibers in the radial directions R from the center of the bottom portion 21*a* as shown in FIG. 3A, an injection location from which the plastic material is injected into a mold for the inner case 21 is preferably at the generally central point of the bottom portion 21*a*, as shown in FIG. 3B. In order to orient the glass fibers in the radial directions R from a point near the edge of the bottom portion 21*a* as shown in FIG. 4A, the injection location is preferably at the point near the edge, as shown in FIG. 4B. If it is difficult to inject the plastic into the mold, the plastic material may be injected into the mold from multiple points.

Second Embodiment

Figure 5:
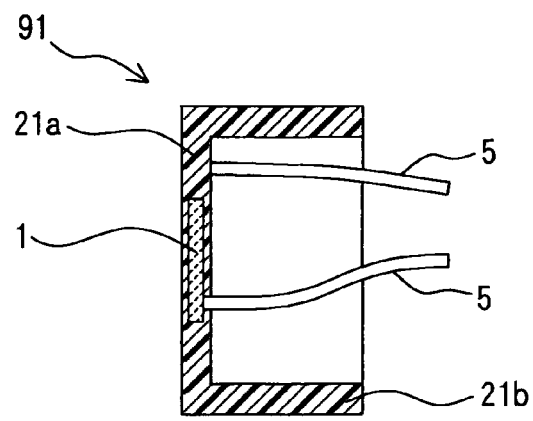
FIG. 5 is a cross-sectional view of an ultrasonic sensor according to a second embodiment.

Hereafter, an ultrasonic sensor 91 of the second embodiment is described with reference to FIG. 5, which shows only a portion of the ultrasonic sensor 91 corresponding to its inner case 21.

The ultrasonic sensor 91 also includes the inner case 21 made mainly of the insulating plastic. However, the conductive film 6 in the first embodiment is not used for the electric conduction. Alternatively, the leads 5 are connected, by soldering, with the electrodes at both the surfaces of the piezoelectric vibrator 1 beforehand. Then the inner case 21 which has the shape of the cylinder having the bottom portion 21*a* is made by plastic injection molding, by using, as an inserted material, the piezoelectric vibrator 1 having the leads 5 at both the electrodes Thus, as shown in FIG. 5, the piezoelectric vibrator 1 can be embedded in the bottom portion 21*a* with the electric conduction being ensured. In this case, efficiency of sending and receiving of the ultrasonic sound is improved, because the vibration is efficiently transmitted between piezoelectric vibrator 1 and bottom portion 21*a*. In addition, the manufacturing process of the ultrasonic sensor 91 can be simplified. Therefore the manufacturing cost of the ultrasonic sensor 91 can be suppressed, because ultrasonic sensor 91 is manufactured by embedding the piezoelectric vibrator 1, which is connected with the leads 5 beforehand into the bottom portion 21*a*.

Modification

The present invention should not be limited to the embodiments discussed above and shown in the figures, but may be implemented in various ways without departing from the spirit of the invention.

Figure 6:
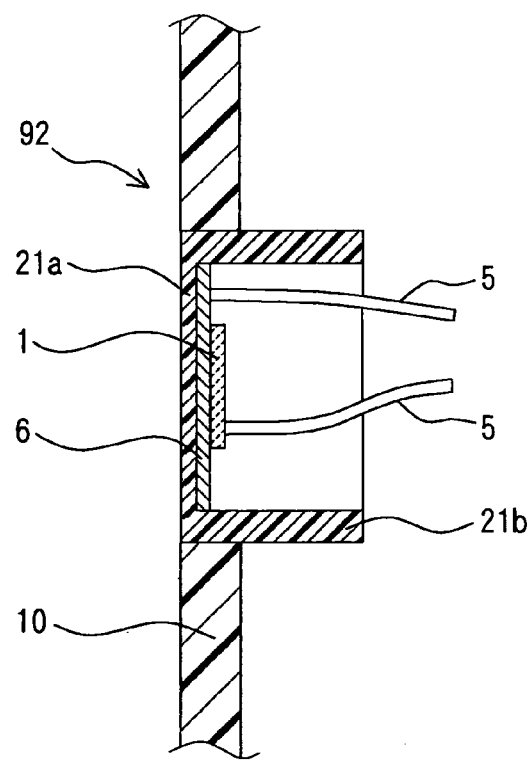
FIG. 6 is a cross-sectional view of a structure of an ultrasonic sensor according to a modification of the first embodiment.

For example, as an ultrasonic sensor 92 shown in FIG. 6, the inner case 21 may be directly attached and fixed to the bumper 10 without intermediation of the vibration-absorption body 3 or the outer case 41, if the inner case 21 is made of plastic which absorbs vibrations efficiently.

The plastic inner case 21 can suppress the vibration transmitted from the bumper 10, because the plastic generally has a damping coefficient of vibrations higher than that of the metal. In addition, the disuse of the vibration-absorption body 3 and the outer case 41 gives the ultrasonic sensor 92 more room for improvement of its design. Moreover, the ultrasonic sensor 92 can be designed so that the surfaces of the ultrasonic sensor 92 and the bumper 10 are smoothly connected with each other. In this case, it is easy to coat with paint the bumper 10 and the ultrasonic sensor 92 simultaneously.

Figure 7:
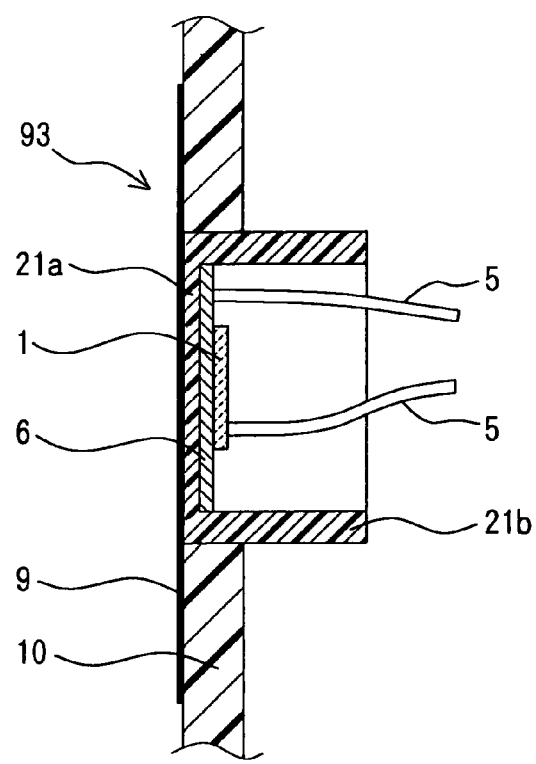
FIG. 7 is a cross-sectional view of a structure of an ultrasonic sensor according to a modification of the first embodiment.

Furthermore, as shown in an ultrasonic sensor 93 in FIG. 7, a plastic film 9 may be attached to the bumper 10 so that at least the bottom portion 21*a* is covered by the plastic film 9. In the case that the plastic film 9 at the bumper 10 covers the exposed surface of the bottom portion 21*a*, the vibration transmitted from the bumper 10 is suppressed by the plastic film 9 and the plastic inner case 21.

The color of the plastic film 9 may resemble the color of the bumper 10 to make the ultrasonic sensor 93 less noticeable. Alternatively, the color of the plastic film 9 may be different from the color of the bumper 10 to accentuate the ultrasonic sensor 93.

What is claimed is:

1. An ultrasonic sensor, comprising:
   a case mainly made of insulating plastic and having a shape of a cylinder with a bottom portion;
   a piezoelectric vibrator fixed to an interior surface of the bottom portion facing an interior of the case, the piezoelectric vibrator having a first electrode at a fixing surface of the piezoelectric vibrator to be fixed to the bottom portion, and a second electrode at an opposite surface of the piezoelectric vibrator opposite to the fixing surface; and
   an electrically conductive member, which is in the form of a metal plate or foil, provided between the first electrode and the bottom portion, in contact with the interior surface to achieve electric conduction between the first electrode and an external circuit.

2. The ultrasonic sensor according to claim 1, wherein the electrically conductive member is attached to the bottom portion with adhesion bond.

3. The ultrasonic sensor according to claim 1, wherein the electrically conductive member is attached to the bottom portion by insert-molding so that a portion of the electrically conductive member is embedded in the bottom portion.

4. The ultrasonic sensor according to claim 1, further comprising a stiffness improving member giving a reinforcement to the stiffness of the bottom portion in order to make the bottom portion stiffer than the plastic.

5. The ultrasonic sensor according to claim 4, wherein the stiffness improving member is a reinforcing plate which is stiffer than the plastic and embedded in the bottom portion.

6. The ultrasonic sensor according to claim 4, wherein the stiffness improving member is a ring-like reinforcing member which is stiffer than the plastic and provided in contact with a cylindrical portion of the case and away from the bottom portion.

7. The ultrasonic sensor according to claim 4, wherein the stiffness improving member includes glass fibers mixed with the plastic and oriented in a direction perpendicular to a thickness direction of the bottom portion.

8. An ultrasonic sensor, comprising:
   a case mainly made of plastic and having a shape of a cylinder with a bottom portion;
   a piezoelectric vibrator fixed to an interior surface of the bottom portion facing an interior of the case;
   a stiffness improving member provided at the bottom portion and giving reinforcement to stiffness of the bottom portion in order to make the bottom portion stiffer than the plastic, and
   a ring-like reinforcing member, which is stiffer than the plastic and provided in contact with a cylindrical portion of the case and away from the bottom portion.

9. The ultrasonic sensor according to claim 8, wherein: the piezoelectric vibrator has: a first electrode at a fixing surface of the piezoelectric vibrator, at the fixing surface the piezoelectric vibrator is fixed to the bottom portion; and a second electrode at an opposite surface of the piezoelectric vibrator opposite to the fixing surface; the stiffness improving member is an electrically conductive plate which is stiffer than the plastic and in contact with the interior surface; the piezoelectric vibrator is fixed to the bottom portion by being attached to the electrically conductive plate in contact with the interior surface; and electric conduction with the first electrode is achieved through the electrically conductive plate.

10. The ultrasonic sensor according to claim 8, wherein the stiffness improving member is a reinforcing plate which is stiffer than the plastic and embedded in the bottom portion.

11. The ultrasonic sensor according to claim 8, wherein the stiffness improving member is a glass fiber mixed with the plastic and oriented in a direction perpendicular to a thickness direction of the bottom portion.

12. The ultrasonic sensor according to claim 1, wherein the case is directly fixed to a bumper of a vehicle so that an exterior surface of the bottom portion facing an exterior of the case is exposed.

13. The ultrasonic sensor according to claim 1, wherein the case is fixed to a bumper of a vehicle so that an exterior surface of the bottom portion facing an exterior of the case is exposed, and a colored plastic film is incorporated into the bumper so as to cover the exposed surface of the case.

14. The ultrasonic sensor according to claim 1, wherein a surface of the electrically conductive member facing the interior of the case is wider than the fixing surface.

15. The ultrasonic sensor according to claim 9, wherein a surface of the electrically conductive plate facing the interior of the case is wider than the fixing surface.

16. The ultrasonic sensor according to claim 1, wherein the electrically conductive member is disposed to fully face the fixing surface of the piezoelectric vibrator.

17. The ultrasonic sensor according to claim 1, wherein the electrically conductive member is disposed only on the bottom portion and fully covers the first electrode.

18. The ultrasonic sensor according to claim 8, wherein the stiffness improving member is disposed only on the bottom portion.

* * * * *